(12) United States Patent
Morales

(10) Patent No.: US 9,105,430 B1
(45) Date of Patent: Aug. 11, 2015

(54) LOW VOLTAGE RESET FOR WATER COOLED AIR CONDITIONER

(71) Applicant: Ready Reset 2X LLC, Pompano Beach, FL (US)

(72) Inventor: John Morales, Pompano Beach, FL (US)

(73) Assignee: Ready Reset 2X LLC, Pompano Beach, FL (US)

( * ) Notice: Subject to any disclaimer, the term of this patent is extended or adjusted under 35 U.S.C. 154(b) by 75 days.

(21) Appl. No.: 14/167,611

(22) Filed: Jan. 29, 2014

Related U.S. Application Data

(60) Provisional application No. 61/764,073, filed on Feb. 13, 2013.

(51) Int. Cl.
  *H01H 9/00* (2006.01)
  *H01H 51/34* (2006.01)
  *H04L 12/28* (2006.01)

(52) U.S. Cl.
  CPC ........ *H01H 51/34* (2013.01); *G05B 2219/2614* (2013.01); *H04L 2012/285* (2013.01); *Y02B 70/3275* (2013.01)

(58) Field of Classification Search
  USPC ................................................. 361/160, 195
  See application file for complete search history.

(56) References Cited

U.S. PATENT DOCUMENTS

| | | |
|---|---|---|
| 3,054,271 A | 9/1962 | McGrath et al. |
| 3,785,165 A | 1/1974 | Valenzuela, Jr. |
| 4,939,909 A | 7/1990 | Tsuchiyama et al. |
| 5,524,448 A | 6/1996 | Schwanebeck et al. |
| 6,062,482 A * | 5/2000 | Gauthier et al. ................. 236/11 |
| 2010/0013308 A1* | 1/2010 | Lathrop et al. .................. 307/64 |

FOREIGN PATENT DOCUMENTS

EP   498645   8/1996

* cited by examiner

*Primary Examiner* — Danny Nguyen
(74) *Attorney, Agent, or Firm* — McHale & Slavin, P.A.

(57) ABSTRACT

A method and device for automatically resetting a water-cooled air conditioner system at least once during a 24 hour period. The device included a tamper resistant housing having a micro-controller electrically coupled to a 24 volt external power source. A normally closed relay is coupled to the micro-controller, the relay having an input and output receptacle for selectively coupling to a low voltage input power line of an air conditioner system. The micro-controller is programmed to randomly open the relay input and output receptacle at least once every 24 hour period to stop the operation of the air conditioning system for timed sequence of about 4 minutes for purposes of resetting the air conditioner system.

23 Claims, 2 Drawing Sheets

LOW VOLTAGE RESET FOR WATER COOLED AIR CONDITIONER

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 61/764,073, entitled "LOW VOLTAGE TIMER RUNNING CUSTOM PROGRAM TO RESET AN AIR CONDITIONER SEVERAL TIMES IN 24 HOUR PERIOD TO PROTECT AGAINST POWER OUTAGE OR SURGE", filed Feb. 13, 2013. The contents of which the above referenced application is incorporated herein by reference.

FIELD OF THE INVENTION

The present invention relates generally to field of air conditioning and, in particular, to a low voltage reset device having a primary use of resetting water-cooled air conditioning system.

BACKGROUND OF THE INVENTION

Power interruptions are defined as short term or long term loss of electrical power. The production of power is based upon an infrastructure that is reliable but quite complex. Power plants such as nuclear, natural gas, coal, hydroelectric, wind, solar and the like are used to generate electrical power. The electrical power can be transported over long distances by use of transmission lines that may be 138,000 volts or higher which are directed to substations for redistribution. Transmission lines typically consist of three cables (2 'hot' and one defining the 'ground' in a 3-phase system) which are suspended from tall towers and exposed to the elements. Transmission supply cables terminate at regional power stations and substations where the high voltages are converted into lower voltages ranging from 13,800 volts to 69,000 volts. This electricity is then transmitted into cities, towns, and neighborhoods either atop local telephone poles or by use of underground wiring. Localized power is provided by a transformer that steps voltage down to 220 volts supplying individual and commercial premises.

The above description illustrates a textbook power distribution wherein the end consumer receives unlimited and uninterrupted power. However, in reality power interruptions can be caused at any time from countless situations. For instance, power interruption may be caused by faults at the power stations, substations, transmission lines and/or distribution connectors, short circuits, overloading, storms, and so forth. A vehicle striking a power pole can result in power interruption. New York City is notorious for its underground electrical cable fires. Transmission lines are aging and in critical need of replacement but the extensive network are so enormous that it cannot be logistically or affordable corrected. The loss of power, even momentary, can cause air conditioning systems to shut down. Even a transient fault, a momentary loss of power is caused by a temporary fault, can be sufficient to disable an air conditioning system. When power is restored the voltage may fluctuate causing the transient fault and most air conditioning systems cannot accept an instant restart resulting in a lock condition.

A voltage fluctuation also known as a brownout takes place when there is a voltage drop in an electrical power supply. A brownout may cause voltage to fluctuate causing the transient fault and again most air conditioning systems cannot accept an instant restart resulting in a lock condition.

In the operation of an air conditioning compressor, once power is interrupted to the compressor it is desirable and in some instances mandatory to keep the compressor off for a period of time. If a compressor is powered off momentarily and immediately restarted, the compressor will have to start up against a high head pressure within the system. To overcome the high head pressure, a large amount of current is passed through the motor windings which can immediately overheat the motor causing a premature fault. For instance, a conventional air conditioner employs a compressor motor that includes a thermal overload switch. When the windings in the motor overheat, the thermal overload switch opens to shut the motor off. Once the windings begin to cool down, the thermal switch resets and the motor is allowed to restart. However, if the high head pressure remains then the motor will trip again and either the thermal switch must be manually reset or the thermal switch must be tricked into cycling between the on and off states. As a result, the momentary power loss can result in a tremendous strain placed on the motor which severely shortens the life of the motor.

This problem is further made problematic in community shared air conditioning systems. For instance, buildings rely upon air conditioners that are water-cooled by use of a cooling tower. Should the flow of water stop for any reason the compressor located in the individual units is forced into a hard lock out. Thus, even if power is maintained to the compressor, the system cannot operate until the power is disconnected from the compressor to allow a reset. In a water-cooled air conditioner, the heat in the Freon gas is discharged into water that is recirculated back to externally mounted water cooler. Should the recirculation pump fail, or the water flow discontinued for any reason, the compression will go into a hard lock out. If the high pressure limit is tripped, the system must cool down and the pressure reduced before restarting. If a restart occurs improperly, the compressor motor will heat up and the above mentioned thermal switch will also require a reset.

There exist many locations wherein even a temporary power interruption can lead to long term consequences. Use of air conditioners in high-rise buildings present a particular problem wherein the building windows do not open and the resident may be absent for long periods of time. The most prominent example of this would be condominiums found in south Florida where winter residents vacant the premises for long periods of time, commonly during the tropical summer months when the heat and humidity remains the highest. Loss of air conditioning in a structure can quickly lead to mold and mildew damage. Should excess water enter the structure, an air conditioner is capable of dehumidifying the air which eliminates excess moisture from becoming a major problem.

A basic solution to the above problem is to employ a maintenance individual to check every structure that is vacant on a daily basis. If the air conditioner unit is shut off due to a power interruption, or in a hard lock out due to the failure of cooling water, a maintenance man can simply restart the system. However, the labor cost of checking every residence on a daily basis can be cost prohibitive. In addition, opening up a residence for inspection causes security concerns.

Other known solutions to power interruptions that caused faults with air conditioners is to include the use of a minimum off-timer in the control circuit of the compressor motor. An interruption in current flow in the motor windings resulting from a power interruption causes the minimum off-time delay circuit to keep the starter relay or contactor, which activates the compressor motor, in a turned off state for a predetermined period of time after the loss of power. By maintaining the compressor motor in an off state for a fixed minimum time period after a power interruption, pressure in the compressor is allowed to stabilize, thereby preventing the motor from overloading when power is reapplied to the system. Although these circuits have been successful in protecting compressor motors, the cost of installing the devices into the control circuits of the systems is relatively high. However, such devices to not address the problems associated with lack of cooling water and the associated hard lock out.

U.S. Pat. No. 3,054,271 discloses an air conditioning control means connecting a circuit and motor for starting and stopping the motor in response to predetermined load conditions. The device includes a timing means in the supply circuit electrically actuated in response to any stopping of the motor to open the supply circuit to preclude restarting of the motor for a predetermined time of constant duration subsequent to each stoppage of the motor.

U.S. Pat. No. 3,785,165 discloses a thermostatic air conditioner control for use with individual unit air conditioners having a thermostatic switch disposed at a location remote from the air conditioner. The control includes circuitry interposed between the air conditioner and a source of electrical energy operative a selected time interval after closure of the thermostatic switch to energize a socket in which the air conditioner is plugged, and operative a selected time interval after opening of said thermostatic switch to de-energize the socket.

U.S. Pat. No. 4,939,909 discloses an air-conditioner with a refrigerating circuit. An electric current path for making a current flow through a compressor includes an AC power source, to which a current transformer is coupled, and an output of the current transformer is converted into a DC voltage which is then given as a (+) input of a comparator. A reference voltage is given to a (−) input of the comparator. When the DC voltage exceeds the reference voltage of the comparator, the high level is outputted from the comparator. When the high-level output from the comparator persists for three seconds, the compressor is stopped forcedly and a three-minute timer is turned on. After a lapse of three minutes, the flow of the current through the current path of the compressor is resumed. Thereby, a lightly locked state is removed. If the output of the comparator still remains at the high level when the energizing is resumed, the compressor is put in the stopped state again. When such stopping and resuming of energizing of the compressor are repeated four times, the energizing of the compressor is stopped assuming that the compressor is in a heavily locked state.

U.S. Pat. No. 5,524,448 discloses a minimum off-time device that delays the restart of a compressor motor of a refrigeration system after power provided to the motor has been interrupted. The minimum off-time device is a standalone unit that is located outside the refrigeration system. The device is retrofitted to the refrigeration system by simply plugging the power line of the system into the device, which is then plugged into an AC wall receptacle, or alternatively, the device can be connected between the power line of the refrigeration system and an electrical circuit breaker panel. The minimum off-time device normally allows power from the AC power source to reach the refrigeration system. However, when a power interruption occurs at the AC power source, and subsequently, power is reapplied, the minimum off-time delay device immediately disconnects the refrigeration system from the AC power source and begins a timing sequence. When the timing sequence ends after a predetermined period of time passes, the minimum off-time device reconnects the refrigeration system to the AC power source.

EP498645B1 discloses a controller for a refrigerator to prevent a voltage drop in the power supply occurring when AC power is supplied to a large number of air conditioners from the same power source simultaneously such as when a power failure is recovered to normal. The controller comprises a time setting circuit to arbitrarily set the timing of a reset signal applied to a microprocessor. A time setting switch to an arbitrary value, the time elapse from the generation of the reset signal to the activation of the compressor. According to the setting of the time setting switch, the microprocessor controls the delay time for starting the air conditioner. When the power supply is restored after power failure, it is possible to prevent the air conditioners from restarting simultaneously and thus prevent a voltage drop in the power supply.

Thus, what is lacking in the industry is a low-cost, maintenance free power interruption device that can be installed without affecting the control circuitry of the air conditioning system and provides a timed reset the system at least once per day.

SUMMARY OF THE INVENTION

Disclosed is a reset device having a particular application to water-cooled air conditioner systems. The reset device operates several times during a 24 Hour period to protect against power interruptions and/or lack of cooling water that may have idled the air conditioner system. The device resets the air conditioner compressor from 1 to 6 times during the 24 hour period, depending on programming, using a 4-minute timed lock-out. After the lock-out period, the air conditioner system will have relieved head pressure and temperature within the unit and will be able to restart. In the event of a power interruption such as a brownout, the device will allow the air conditioner to restart immediately upon the restoring of power. In the event of a lack of water flow, the device will reset at a preprogrammed or randomly choose time. The device can be used in conjunction with existing internal proprietary safety devices.

An objective of the invention is to provide a low cost power interruption device that is capable of resetting an air conditioner several times in 24 hour period.

A further objective of the invention is to provide an automatic water-cooled air conditioner reset controller to eliminate the need for manual resets of an air conditioning system.

Still another objective of the invention is to provide an automatic air conditioner reset controller that protects air conditioner systems from short cycling due to power interruption or lack of water flow.

Yet another objective of the invention is to provide an automatic air conditioner reset controller that operates on low voltage eliminating the need for electrical permits.

Still another objective of the invention is to provide an automatic air conditioner reset controller for water-cooled air conditioning systems that is completely automatic and devoid of any manually operated switches.

Yet another objective of the invention is to provide a reset controller that employs LED operating lights to indicate operational modes of the controller and for troubleshooting of the air conditioning system.

An advantage of the automatic air conditioner reset controller is that it does not interfere with and proprietary safety device or control.

Another advantage of the air conditioner reset controller for use in water-cooled systems is that it eliminates the labor cost of checking individual units and the liability that can be associated with entering a vacant premise.

Other objectives and further advantages and benefits associated with this invention will be apparent to those skilled in the art from the description, examples and claims which follow.

DETAILED DESCRIPTION OF THE PREFERRED EMBODIMENT

A detailed embodiment of the instant invention is disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
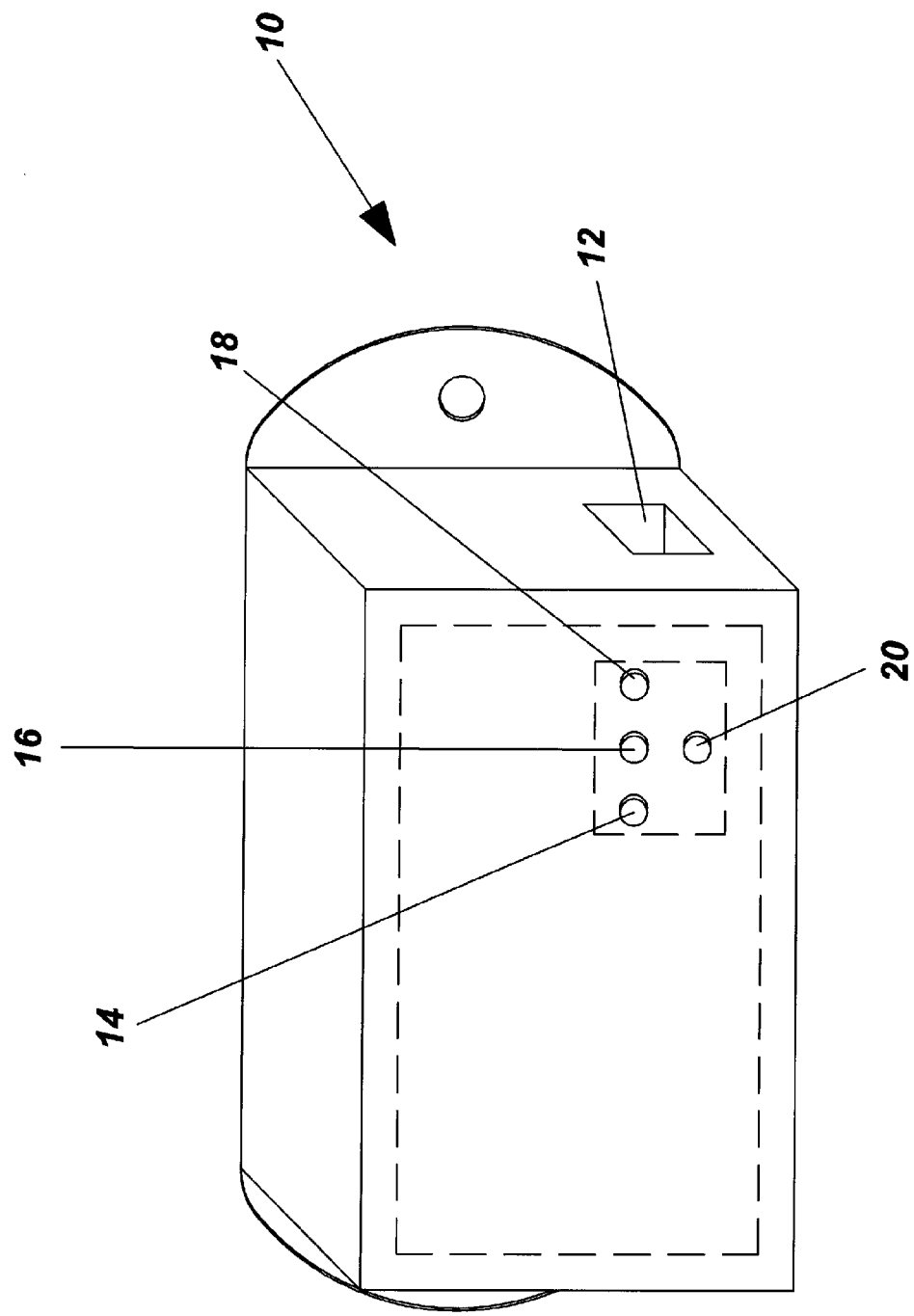
FIG. 1 is a pictorial of the control box indicator lights.
Figure 2:
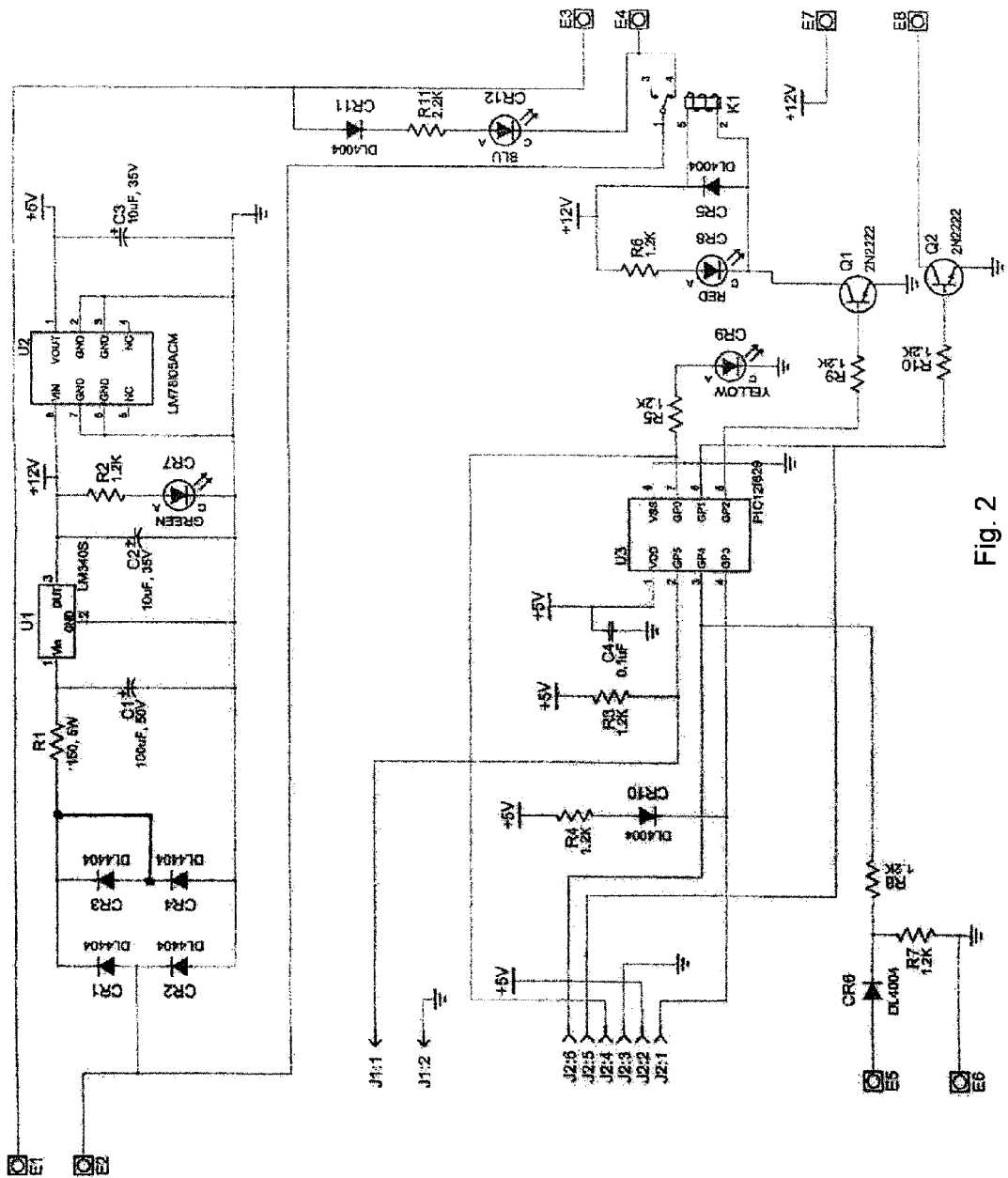
FIG. 2 is an electrical schematic of the timing circuit board.

Disclosed is a method and device for automatically resetting an air conditioner system that is water-cooled. The reset controller operates at least once during a 24 hour period to overcome any compressor lock-out that may have occurred. Referring to FIG. 1, the device included a tamper resistant housing 10 having a micro-controller with a counter enclosed therein which are electrically coupled to a 24 volt external power source by a connection extending thru the housing by a receptacle 12. Also placed within the housing 10 is a normally closed relay that is coupled to the micro-controller, the relay having an input and output connection securable at the receptacle 12, the relay is used selectively coupling to a low voltage input power line of an air conditioner system. The micro-controller is programmed to randomly open the relay input and output connection at least once every 24 hour period to stop the operation of the air conditioning system for timed sequence of about 4 minutes for purposes of resetting the air conditioner system.

The device is programmed to reset an air conditioning unit at least once or preferably several times in 24 hour period to ensure that the air conditioner restarts in the event of a power outage or surge. The timed sequence operates whether the air conditioned space is occupied or vacant.

The housing includes 4 self-diagnostic LEDs to monitor the different modes: a green LED 14 shows 24-volt of power flowing from the air conditioning unit; a yellow LED 16 blinks to show the micro-controller is operating; a red LED 18 turns on only during the 4-minute timed lock-out period; and a blue LED 20 shows the device is in normal run mode. The LED lights operate to indicate that the unit is working properly and can further function to diagnosis problems with the air conditioner.

Referring to the electrical schematic, the device operates on 24 volt AC voltage coupling to terminals E1 and E2. The AC voltage is converted to direct current using a parallel series arrangement of diodes 1N4404, CR1-CR4, with Resistor R1 rated at 150,5 w and Capacitor C1 100 uf, 50V. Voltage is reduced to 12V using an Lm7812 regulator with a stabilizing capacitor C2 rated at 10 uf, 35 v. A 5V Regulator U2 is an Lm78L05 three terminal positive regulator to provide an effective output impedance improvement of two orders of magnitude and lower quiescent current stabilized by capacitor C3 rated at 10 uf, 35 v. The voltage operation is verified by the Green LED CR7 which indicates the low voltage operation of the regulator and verifies that the AC input voltage of 24 v AC is available. Should either the AC input voltage or step down DC output voltage fail, the green LED will not light.

The low voltage 5 v DC is directed to the timing circuit consisting of terminals J2:1-J2:6. The timing circuit employs a PICF629 programmable microcontroller U3 having a power on reset. The microcontroller is programmed to reset an air conditioner system several times in a 24 Hour period to protect against power interruptions that may have idled the air conditioner system. The device resets the air conditioner system automatically from 1 to 6 times during the 24 hour period using a 4-minute timed lock-out. Power is directed to relay coil K1 having contacts to interrupt the low voltage used to operate a conventional air conditioner system. An NPN bipolar junction transistor Q1 is used for low power amplifying of the coil K1. Diode CR5 is a 1N4004 to prevent backfeed.

A red LED CR8 indicates the SPDT Relay is open, thereby shutting down the air conditioning system. The micro-controller counts to allow about a 4 minute period to expire. After the lock-out, the air conditioner system will be able to restart. In the event of a power interruption such as a brownout or blackout, the device will allow the air conditioner to restart immediately upon the restoring of power and waiting of the 4 minute period. In the preferred embodiment, the micro-controller resets the air conditioning system four days a day. The multiple resets allow for resetting periods in an amount sufficient to catch most power interruptions from affecting the environmental conditions within the unit being service by the air conditioning system. The use of a controller that operates on low voltage eliminates the need for electrical permitting. The reset controller is designed to be completely automatic and devoid of any manually operated switches. Yellow LED CR9 is coupled to the microcontroller and illuminates when the microcontroller is operating.

The conventional water-cooled air conditioning system employs an internal low voltage transforming circuit with a 300 mL draw. The 24 volts are supplied by the air conditioners internal low voltage transformer. The device monitors the incoming 24 volts which is used to supply voltage to an internal micro-controller.

The device resets the compressor in the water-cooled air conditioner system one to six times in a 24-hour period. If there is a momentary power interruption, the device will create a 4 minute time out to prevent short cycling of the connected equipment. If the power interruption is for an extended time period then the device will turn on automatically when the electricity come on and immediately draw voltage from the air conditioners low voltage transformer. This will cause the program to re-start with a 4-minute time lock and subsequent resetting of the air conditioning unit. If the compressor is locked out, the reset controller will attempt to restart. If the fault remains, the resent controller will continue to attempt restarts over a period of time in accordance with the reset controller timing.

All patents and publications mentioned in this specification are indicative of the levels of those skilled in the art to which the invention pertains. All patents and publications are herein incorporated by reference to the same extent as if each individual publication was specifically and individually indicated to be incorporated by reference. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A reset controller for water-cooled air conditioners comprising: a micro-controller electrically coupled to an external power source; a relay coupled to said micro-controller, said relay having an input and output receptacle for selectively coupling to said external power source; said micro-controller randomly uncouples said relay input and output receptacle at least once every 24 hour period for a timed sequence; wherein said micro-controller randomly interrupts input power to a water-cooled air conditioner for the timed sequence and reconnects said input power after the timed sequence has passed.

2. The reset controller for water-cooled air conditioners according to claim 1 wherein said external power source is an air conditioner low voltage transformer.

3. The reset controller for water-cooled air conditioners according to claim 2 wherein said low voltage transformer is 24 volts.

4. The reset controller for water-cooled air conditioners according to claim 2 wherein said low voltage transformer is 12 volts.

5. The reset controller for water-cooled air conditioners according to claim 1 wherein said time to uncouple said relay is randomly chosen during the 24 hour period.

6. The reset controller for water-cooled air conditioners according to claim 1 wherein said micro-controller is adjustable to uncouple said relay input and output receptacle about four times over a 24 hour period.

7. The reset controller for water-cooled air conditioners according to claim 6 including a means for adjusting said micro-controller is used to alter the amount of times the relay is uncoupled.

8. The reset controller for water-cooled air conditioners according to claim 1 wherein said timed sequence is about 4 minutes.

9. The reset controller for water-cooled air conditioners according to claim 1 including an LED that illuminates when input voltage is present.

10. The reset controller for water-cooled air conditioners according to claim 1 including an LED that illuminates when said micro-controller is operational.

11. The reset controller for water-cooled air conditioners according to claim 1 including an LED that illuminates when said timed sequence occurs.

12. The reset controller for water-cooled air conditioners according to claim 1 including an LED that illuminates when said device is in a normal run mode.

13. A reset controller for automatically resetting a water-cooled air conditioner system at least once during a 24 hour period, wherein the air conditioner system includes a compressor motor coupled to an external power source comprising: a tamper resistant housing; a micro-controller placed within said housing, said micro-controller electrically coupled to a 24 volt external power source, said external power source providing an input voltage to said micro-controller; a normally closed relay coupled to said micro-controller, said relay having an input and output receptacle for selectively coupling to a low voltage input power line of a air conditioner system; said micro-controller randomly opens said relay input and output receptacle at least once every 24 hour period to stop the operation of the air conditioning system for a timed sequence of about 4 minutes and reconnects said input power line between said relay input and output after the timed sequence is complete.

14. The reset controller according to claim 13 wherein said micro-controller is adjustable to uncouple said relay input and output receptacle between one and six times over a 24 hour period.

15. The reset controller according to claim 14 including a means for adjusting said micro-controller to alter the amount of times the relay is uncoupled.

16. The reset controller according to claim 13 including an LED that illuminates when input voltage is present.

17. The reset controller according to claim 13 including an LED that illuminates when said micro-controller is operational.

18. The reset controller according to claim 13 including an LED that illuminates when said timed sequence occurs.

19. The reset controller according to claim 13 including an LED that illuminates when said device is in a normal run mode.

20. A method to automatically reset an air conditioner, wherein the air conditioner system is water-cooled and includes a compressor motor coupled to an external power source comprising:
   connecting a micro-controller to a 24 volt transformer mounted in said air conditioner system;
   positioning a relay between an external power source and the air conditioner system, said relay coupled to said micro-controller;
   producing a random signal from said micro-controller at least once during a 24 hour period to energize said relay and interrupt the external power source from the air conditioner; and
   resuming power to the air conditioner from the external power source after a timed sequence of about 4 minutes.

21. The method to automatically reset a air conditioner according to claim 20 including the step of uncoupling said relay input from the external power source and the air conditioner system between one and six times over a 24 hour period.

22. The method to automatically reset an air conditioner according to claim 20 including the step of adjusting said micro-controller to alter the amount of times the relay is uncoupled.

23. The method to automatically reset an air conditioner according to claim 20 including the step of activating an LED when input voltage is present, activating an LED when said micro-controller is operational, activating an LED during said timed sequence, and activating an LED when said device is in a normal run mode.

* * * * *